United States Patent Office 2,850,464
Patented Sept. 2, 1958

2,850,464
MANUFACTURE OF CELLULAR POLYURETHANE PLASTICS

Andrew Mitchell 3d, Hockessin, Del., assignor to E. I. du Pont de Nemours and Company, Wilmington, Del., a corporation of Delaware No Drawing. Application September 22, 1953
Serial No. 381,745
11 Claims. (Cl. 260—2.5)

This invention relates to the preparation of cellular plastic materials and more particularly to the preparation of cellular polyurethane products formed from the reaction of polyhydroxy compounds and organic diisocyanates. Still more particularly it relates to a process by which the density of such products may be controlled at will.

The preparation of cellular plastic products or plastic foams in which polyisocyanates are used as reactants has been described in "German Plastics Practice" by De Bell et al., 1946, pages 316 and 463–465. The cellular materials there described are prepared from the reaction of diisocyanates with alkyl resins which contain free hydroxyl and carboxyl groups. Somewhat similar plastic foams prepared from alkyd resins and diisocyanates are described in Simon et al. U. S. Patents 2,577,279 and 2,597,025.

An isocyanate plastic foam having improved resistance to deformation or destruction as a result of compression, flexing or impact is described in U. S. Patent 2,787,601. The plastic foams there described are obtained by reacting an arylene diisocyanate with a fatty acid triglyceride having a hydroxyl number of at least 49, and thereafter reacting this product with water. Other products of this general type in which the plastic foam is prepared from the reaction product of an epoxy resin with castor oil and diisocyanates are described in U. S. Patent 2,788,335. These latter products are able to withstand high pressures and much flexing without breakdown.

The strength, toughness and rigidity of polyisocyanate plastic foams generally increase with increasing density. Where these properties are of importance, as in structural reinforcements, the denser foams are preferred over the lighter products. It is desirable in any case that the density of the plastic foam be controlled in order to give the optimum characteristics for each particular application. Control of density without adverse effect on the other properties of the cellular reaction products has heretofore been difficult to accomplish.

The foams are formed by allowing polyurethane products containing free isocyanate groups to react with water. This reaction results in the formation of urea linkages and produces chain extension and ultimately cross-linking with the formation of a rigid structure, and also generates carbon dioxide which foams the resinous mass into the desired cellular plastic. According to the prior art, foams having high density may be prepared either by employing a polyurethane product having only a small number of free isocyanate radicals, or by using only a small amount of water during the foaming step. Neither method is completely satisfactory. When only a few free isocyanate radicals are present, the resulting foam, although dense, is incompletely set and is lacking in strength and other desired properties. In addition, when insufficient amounts of isocyanate are present, the mass is usually viscous, difficult to handle and non-uniform. On the other hand, when it is attempted to control the density by using small, measured amounts of water, the resulting foamed plastic still contains free isocyanate and is consequently unstable and sensitive to the moisture in the air. The cellular plastic will therefore change in its properties on standing and in use. The physical properties of the foam are also apt to be deficient because chain extension is incomplete, while cross-linking may proceed to an undesired extent.

It is an object of this invention to provide a method for controlling the density of cellular plastic reaction products and for obtaining relatively high density foams without sacrifice in other physical properties. Further objects will appear from the detailed description which follows.

This invention is applicable in the preparation of plastic foams from a fluid polyurethane product containing free isocyanate groups which yields upon reaction with an amount of water stoichiometrically equivalent to the free isocyanate content of the said product a plastic foam having a lower density than is desired. According to this invention, a plastic foam of the desired density is obtained by reacting the said polyurethane product with a mixture of water and a compound having a plurality of groups containing active hydrogen, said compound being free from groups which evolve gas upon reaction with isocyanates, the combined amount of water and compound containing active hydrogen being approximately equivalent stoichiometrically to the amount of free isocyanate groups in the polyurethane, and the proportions of water and the active hydrogen compound being selected to produce a foam of the desired density.

In making foams according to prior art methods, water and a catalyst are added to the fluid reaction product containing free isocyanate, the mass is thoroughly and quickly mixed and the evolved carbon dioxide is allowed to expand the resinous mass into the desired foamed plastic. In carrying out the process of this invention, the same procedure is used except that in place of adding water, a mixture of the compound having a plurality of groups containing active hydrogen and water in the selected proportions is added to the fluid mass.

The process of this invention may be used with any fluid polyurethane product containing free isocyanate groups which forms a plastic form upon reaction with water. Among such products are reaction products of an alkyd resin and an excess of an arylene diisocyanate such as are described by De Bell et al., supra; reaction products of fatty acid triglycerides such as castor oil with an arylene diisocyanate, as described in U. S. Patent 2,787,601; and reaction products of epoxy resins, castor oil and diisocyanates, as described in U. S. Patent 2,788,335. The reaction products of arylene diisocyanates and polyalkylene ether glycols are also useful in the practice of this invention.

The organic compound having a plurality of groups containing active hydrogen is selected from a wide variety of polyfunctional compounds, including polyamines, polyalcohols, aminoalcohols, polyhydroxy esters, polyamides, polythiols, polysulfonamides and various mixtures of these types. This compound must not contain carboxyl or sulfonic acid groups which evolve gas upon reaction with isocyanates. The term "active hydrogen atoms" refers to hydrogens which display activity according to the Zerewitinoff test as described by Kohler in J. Am. Chem. Soc., 49, 3181 (1927). The compound must contain at least two groups containing active hydrogen so that when reaction of both with isocyanate groups takes place, there will be a resulting chain extension or cross-linking which will produce compounds having desirable strength, toughness and other physical properties. Typical of many organic compounds which are useful in this connection are ethylene glycol, glycerin, diethanolamine, N-ethylethanolamine, triethanolamine, 1,2,6-hexanetriol, diethylene glycol, adipamide, 1,2-ethanedithiol, hydroquinone, m-phenylenediamine, propylenediamine, 4-aminobenzamide, sulfanilamide, 1,4-cyclohexanedisulfonamide, 1,3 - propanedisulfonamide, p - aminophenol, ethylenediamine, succinamide, 1,4-butanedisulfonamide, 2,4-tolylenediamine and bis(4-aminophenyl) methane. Glycols and aminoalcohols are in general preferred. It is also within the scope of this invention to use for this purpose relatively high molecular weight materials such as polyesters having terminal hydroxy groups, prepared from polyalcohols and polycarboxylic acids. Instead of using a single active-hydrogen compound as the density controlling agent, a mixture of two or more such compounds may be employed.

In order that plastic foams may be prepared from the polyurethane products, these products must contain substantial amounts of free isocyanate groups, usually of the order of 10 to 20% of the entire weight of the product. The amount of free isocyanate may be determined by dissolving a sample of the polyurethane product in a solvent such as tetrahydrofuran, adding an excess of a standard solution of n-butylamine in tetrahydrofuran, and back-titrating with a solution of hydrogen chloride using bromphenol blue as an indicator. There is preferably used a combined amount of water and the compound having a plurality of groups containing active hydrogen which is approximately equivalent stoichiometrically to the amount of residual isocyanate in the polyurethane product. If too much water and active hydrogen compound are used, the excess may act as a plasticizer or may confer unwanted reactivity on the foam. If too little of these compounds is used, the remaining free isocyanate groups can then react with other active hydrogens in the resinous materials. Cross-linking will then usually result and will make the final product more rigid than when the amount of water is sufficient to react with all of the isocyanate groups. To the extent that the residual isocyanate radicals do not react in this manner, they contribute unwanted reactivity and instability to the cellular product.

The proportions of water and compound having a plurality of groups containing active hydrogen should be selected to give a final product having the density which is desired. The optimum proportions will depend on the nature of the polyurethane product, on its total isocyanate content, and on the desired ultimate density of the foam, and obviously cannot be stated empirically. As less water and more of the compound which produces no foaming are used, the density of the final product increases. Unless extreme precautions are used to exclude moisture from the air and from the reactants, there will ordinarily be some foaming even if no water is added as such. The density of the final product, however, will under such circumstances approach closely to that of a solid plastic formed from the same materials but with milling or other treatment to eliminate the bubbles.

A tertiary amine catalyst is preferably used during the formation of the plastic foam to accelerate the reaction between the isocyanate and the water or other active hydrogen-containing compound. The catalyst may be omitted and a longer time of curing may be used, or the reaction may be speeded up by use of elevated temperatures. Ordinarily it is much simpler and more practical to carry out the reaction in the presence of the tertiary amine catalyst. Suitable tertiary amines include triethylamine, diethylcyclohexylamine, dimethylhexadecylamine, dimethylcetylamine, pyridine, quinoline and 3-methylisoquinoline.

The method of carrying out this invention is illustrated by the following examples, in which parts are by weight:

Example 1

To a mixture of 90 parts of castor oil and 10 parts of polyethylene ether glycol having a molecular weight of about 200 is added 100 g. of 2,4-tolylene diisocyanate. An exothermic reaction takes place and is allowed to go to completion without additional heating.

Portions of the polyurethane product so prepared are used to make a series of foamed compositions with mixtures of water and 2,4-dimethyl-2-(beta-hydroxyethoxymethyl)-pentanediol-1,5 in various proportions. In each case a mixture of the water, the triol and diethylethanolamine as a catalyst is prepared and the mixture is quickly incorporated into the polyurethane product using either a hand paddle or an electric stirrer. When the ingredients are blended, reaction begins spontaneously and the evolution of carbon dioxide causes the polymer to foam. Within a few minutes there is formed a cellular plastic material of high strength and flexibility. The proportions of ingredients used and the densities of the resulting products are shown in the following table.

|   | Parts by weight | | | | Density, lbs./cu. ft. |
|---|---|---|---|---|---|
|   | Polyurethane product | Triol | Water | Catalyst | |
| A | 50 | 0 | 2 | 0.89 | 1.48 |
| B | 50 | 1.5 | 1.8 | 0.89 | 2.3 |
| C | 50 | 3.1 | 1.6 | 0.89 | 2.64 |
| D | 50 | 4.6 | 1.4 | 0.89 | 2.91 |
| E | 50 | 6.1 | 1.2 | 0.89 | 3.07 |
| F | 50 | 7.6 | 1.0 | 1.77 | 3.96 |
| G | 50 | 9.2 | 0.8 | 1.77 | 4.83 |
| H | 50 | 9.6 | 0.6 | 1.77 | 4.68 |
| I | 50 | 12.3 | 0.2 | 1.77 | 4.99 |
| J | 50 | 13.8 | 0.1 | 1.77 | 15.65 |

Example 2

Plastic foamed compositions are prepared by the procedure outlined in Example 1, using the same polyurethane product but using ethylene glycol instead of 2,4-dimethyl-2-(beta-hydroxyethoxymethyl)-pentanediol-1,5 and using triethylamine as a catalyst instead of diethylethanolamine. The proportions of ingredients used and the densities of the resulting plastic foams are shown in the following table.

|   | Parts by weight | | | | Density, lbs./cu. ft. |
|---|---|---|---|---|---|
|   | Polyurethane product | Ethylene glycol | Water | Catalyst | |
| A | 50 | 0 | 2 | .364 | 1.88 |
| B | 50 | 3.4 | 1 | .364 | 5.1 |
| C | 50 | 4.25 | 0.75 | .364 | 5.2 |
| D | 50 | 6.0 | 0.25 | .364 | 6.6 |

Example 3

A polyurethane product is prepared by adding 100 parts of 2,4-tolylene diisocyanate to a mixture of 85 parts of castor oil and 15 parts of polyethylene ether glycol having a molecular weight of about 200. An exothermic reaction takes place spontaneously. When the reaction is complete, portions of the polyurethane product are combined with mixtures of water, diethanolamine and diethylethanolamine as a catalyst, in the proportions shown below. The densities of the resulting plastic foamed compositions are as follows:

|   | Parts by weight | | | | Density, lbs./cu. ft. |
|---|---|---|---|---|---|
|   | Polyurethane product | Diethanolamine | Added water | Catalyst | |
| A | 50 | 0 | 1.65 | 0.89 | 2.04 |
| B | 50 | 4.8 | 0.83 | 0.89 | 6.2 |
| C | 50 | 9.6 | 1 0 | 0.89 | 31.7 |

[1] Small amount of water picked up from air, from catalyst and from amine.

Example 4

Additional cellular reaction products are prepared as in Example 3, except using N-ethylethanolamine instead of diethanolamine, as the compound containing a plurality of active hydrogen groups. The resulting plastic foams are of good quality and have the densities shown below:

|  | Parts by weight | | | | Density, lbs./cu. ft. |
|---|---|---|---|---|---|
|  | Polyurethane product | N-ethylethanolamine | Added water | Catalyst |  |
| A | 50 | 4.1 | 0.83 | 0.89 | 3.6 |
| B | 50 | 8.2 | ¹0 | 0.89 | 22.3 |

¹ Small amount of water picked up from air, from catalyst and from amine.

Example 5

A polyester is prepared by heating together under nitrogen 548 parts of 1,2,6-hexanetriol, 64 parts of phthalic anhydride and 317 parts of adipic acid at 170–175° C. The mixture is stirred at reaction temperature for 19 hours and then cooled. The resin thus obtained contains 0.046% water, has a hydroxyl number of 423 and an acid number of 2.17. This resin is mixed in various proportions with water and with diethylethanolamine catalyst and plastic foams are prepared by adding portions of the mixtures to a polyurethane product prepared as in Example 3. The effect of varying the proportions of water and the polyhydroxy polyester is illustrated by the following results:

|  | Parts by weight | | | | Density, lbs./cu. ft |
|---|---|---|---|---|---|
|  | Polyurethane product | Polyester | Added water | Catalyst |  |
| A | 50 | 12 | 0.83 | 0.89 | 7.5 |
| B | 50 | 24 | ¹0 | 0.89 | 47.0 |

¹ Small amount of water picked up from air, from catalyst and from polyester.

Example 6

Plastic foams are prepared using the polyurethane product described in Example 1. One portion of this product is mixed with water and diethylcyclohexylamine as a catalyst. Another portion is mixed with the same catalyst and glycerin containing about 5% water. The amounts of ingredients used per 100 parts by weight of polyurethane product and the physical properties of the resulting cellular products are shown below:

|  | Parts by weight | | | Density, lbs./cu. ft. | Tensile strength, lbs./sq. in. |
|---|---|---|---|---|---|
|  | Glycerin | Water | Catalyst |  |  |
| A | 0 | 4 | 0.87 | 1.65 | 4.5 |
| B | 12 | 0 | 0.87 | 6.48 | 42.5 |

Example 7

A polyurethane polymer is prepared by adding 348 parts of 2,4-tolylene diisocyanate containing 0.3 part of benzoyl chloride as a stabilizer to prevent gelling to 300 parts of polyethylene ether glycol having a molecular weight of about 300. Reaction takes place without external heating. To portions of this product are added mixtures of water, an N,N'-diethylethanolamine catalyst and glycerin (containing 5% water) in the proportions shown below. The densities of the resulting plastic foams are as follows:

|  | Parts by weight | | | | Density, lbs./cu. ft. |
|---|---|---|---|---|---|
|  | Polyurethane product | Glycerin | Water | Catalyst |  |
| A | 50 | 0 | 1.39 | 0.89 | 2.82 |
| B | 50 | 3.5 | 0.7 | 0.89 | 3.30 |
| C | 50 | 7.1 | 0 | 0.89 | 13.22 |

Example 8

A polyurethane product is prepared by mixing 33 parts of a commercial oil-modified alkyd resin containing terminal hydroxyl groups ("Beckosol-24," manufactured by Reichhold Chemical Company) with 17 parts of 2,4-tolylene diisocyanate. Reaction takes place with the evolution of heat. Portions of the resulting product are mixed with water, glycerin (containing 5% water) and N,N'-diethylethanolamine catalyst in the proportions shown below. Plastic foams of varying densities are obtained. These densities are as follows:

|  | Parts by weight | | | | Density, lbs./cu. ft. |
|---|---|---|---|---|---|
|  | Polyurethane product | Glycerin | Added water | Catalyst |  |
| A | 50 | 0 | 2.0 | 0.89 | 2.4 |
| B | 50 | 3.0 | 1.0 | 1.77 | 5.0 |
| C | 50 | 6.0 | 0 | 1.77 | 13 |

By means of the process of this invention, it is possible to prepare stable plastic foams of predetermined density from a wide variety of polymeric materials without sacrifice of other desirable physical properties. Relatively high density foamed products, which hitherto have been difficult to prepare, may conveniently be made by this process.

What is claimed is:

1. In the preparation of plastic foams from a fluid polyurethane product, said product being selected from the group consisting of (a) a reaction product of an arylene diisocyanate and an alkyd resin containing a plurality of hydroxyl groups, (b) a reaction product of an arylene diisocyanate and a fatty acid triglyceride having a hydroxyl number of at least 49, (c) a reaction product of an arylene diisocyanate, an epoxy resin and castor oil, and (d) a reaction product of an arylene diisocyanate and a polyalkylene ether glycol, said product containing free isocyanate groups, said groups comprising from about 10 to 20% of the entire weight of said product, and said product yielding a plastic foam upon reaction with a sufficient amount of water to provide about 0.5 mole of water for each isocyanate group in said polyurethane product, the method of preparing a plastic foam of higher density which comprises reacting the said polyurethane product with a mixture of water and an organic compound having a plurality of groups containing active hydrogen, said groups being selected from the class consisting of amino groups and hydroxyl groups, the combined amount of water and compound containing active hydrogen being sufficient to react with all free isocyanate groups in the polyurethane; there being used for every 100 parts by weight of said fluid polyurethane product from about 0.2 to 4.0 parts by weight of water and no more than about 48 parts by weight of compound containing active hydrogen so as to produce a plastic foam ranging in density from more than 1.48 to about 47.0 pounds per cubic foot.

2. A process according to claim 1 in which the reaction is carried out in the presence of a tertiary amine catalyst.

3. A process according to claim 1 in which the polyurethane product is a reaction product of castor oil with an arylene diisocyanate, said polyurethane product containing free isocyanate groups which comprise from about 10 to 20% of the entire weight of said product.

4. A process according to claim 1 in which the polyurethane product is a reaction product of a polyalkylene ether glycol with an arylene diisocyanate, said polyurethane product containing free isocyanate groups which comprise from about 10 to 20% of the entire weight of said product.

5. A process according to claim 1 in which the polyurethane product is a reaction product of an alkyd resin and an arylene diisocyanate, said polyurethane product containing free isocyanate groups which comprise from about 10 to 20% of the entire weight of said product.

6. A process according to claim 1 in which the compound having a plurality of groups containing active hydrogen is a compound containing as its only source of active hydrogen a plurality of hydroxyl groups.

7. A process according to claim 6 in which the compound containing hydroxyl groups is ethylene glycol.

8. A process according to claim 6 in which the polyurethane product is a reaction product of a mixture containing 80 to 95% by weight castor oil and 5 to 20% polyethylene ether glycol with 2,4-tolylene diisocyanate, said polyurethane product containing free isocyanate groups which comprise from about 10 to 20% of the entire weight of said product.

9. A process according to claim 6 in which the compound containing hydroxyl groups is glycerin.

10. A process according to claim 1 in which the compound having a plurality of groups containing active hydrogen is an aminoalcohol in which the amine and hydroxyl radicals contain all of the active hydrogen atoms present in the compound.

11. A process according to claim 10 in which the aminoalcohol is diethanolamine.

References Cited in the file of this patent

UNITED STATES PATENTS

| | | |
|---|---|---|
| 2,602,783 | Simon et al. | July 8, 1952 |
| 2,621,166 | Schmidt et al. | Dec. 9, 1952 |
| 2,642,403 | Simon et al. | June 16, 1953 |
| 2,650,212 | Windemuth | Aug. 25, 1953 |
| 2,729,618 | Muller et al. | Jan. 3, 1956 |

OTHER REFERENCES

De Bell et al., "German Plastics Practice," pub. 1946 by De Bell and Richardson, Springfield, Mass., pages 300 to 304, 310, and 463 to 465.